Jan. 3, 1950     D. E. TRUCKSESS     2,493,094
VOLTAGE REGULATION
Filed Feb. 7, 1947
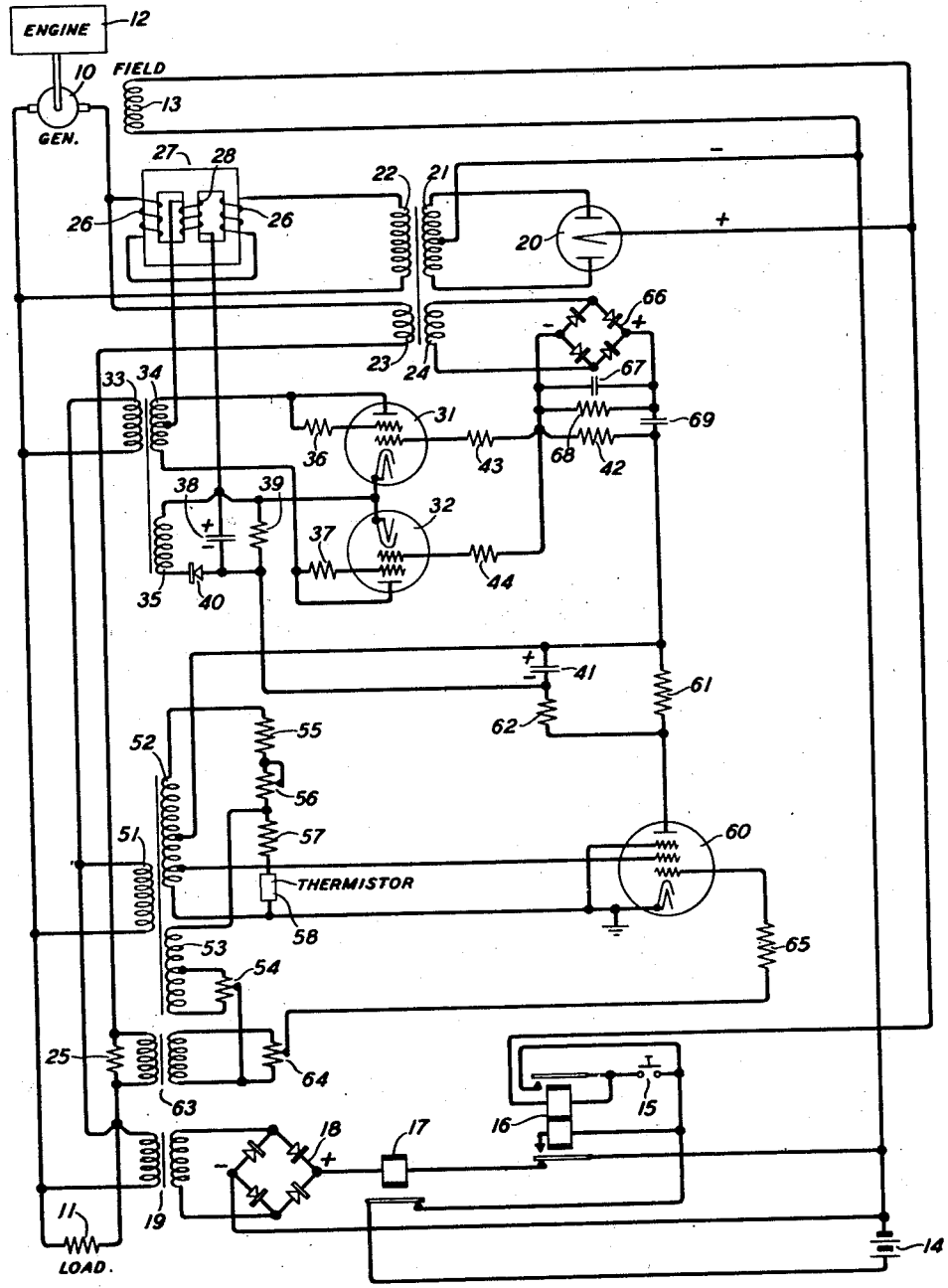
INVENTOR
D. E. TRUCKSESS
BY
G. F. Heuerman
ATTORNEY Patented Jan. 3, 1950

2,493,094

UNITED STATES PATENT OFFICE 2,493,094

VOLTAGE REGULATION

David E. Trucksess, Summit, N. J., assignor to Bell Telephone Laboratories, Incorporated, New York, N. Y., a corporation of New York Application February 7, 1947, Serial No. 727,041

11 Claims. (Cl. 322—19)

1

This invention relates to voltage regulation and particularly to apparatus for controlling the energization of a field winding of a generator to control its output voltage.

An object of the invention is to provide novel apparatus for controlling the output voltage of an alternator which supplies current to a load to minimize load voltage changes.

Another object is to provide a novel voltage regulating circuit having means for minimizing transient load voltage changes.

In a specific embodiment of the invention herein shown and described for the purpose of illustration, there is provided for supplying alternating current to a load an alternator having a field winding to which exciting current is supplied by a rectifier, current being supplied to the rectifier from the alternator by way of two electric paths. One of the paths is connected across the generator output terminals and comprises a transformer winding and the alternating current winding of a saturable reactor in series and the other path comprises a second winding of the transformer connected in series with the load. A third winding of the transformer is connected to a circuit for setting up a transient biasing voltage in response to a change of load current. The saturable reactor has a saturating winding to which current is supplied for controlling the inductance of its alternating current winding. When the generated current is at its maximum frequency, if no current were supplied to the saturating winding of the reactor, sufficient exciting current would be supplied to the generator field winding to bring the load voltage to a value somewhat below the normal operating value of 115 volts, say to 105 volts. A circuit is provided for supplying sufficient current to the saturating winding to cause the excitation of the generator field to be increased to such an extent that the load voltage is raised to its normal value of 115 volts.

The circuit for supplying current to the saturating winding of the reactor comprises a rectifier for rectifying current from the generator output under control of a control voltage impressed upon a control circuit of the rectifier, the control voltage having a plurality of components. One of the control voltage components derived from the load circuit controls the rectifier so as to tend to maintain the load voltage substantially constant. However, the circuit provided for setting up this control voltage component is somewhat sluggish in its response to load voltage changes and there is therefore provided means

2 for setting up a second component of the control voltage for minimizing transient changes of load voltage.

The invention may be better understood from the following description with reference to the accompanying drawing the single figure of which is a diagrammatic view of a current supply apparatus embodying the invention.

Referring to the drawing, there is provided a 115 volt, 8 kilovolt-ampere alternating current generator 10 for supplying current within a frequency range of 400 to 800 cycles, for example, to a load 11 when the generator is driven by any suitable means such as an airplane engine 12 and when exciting current is supplied to a field winding 13 of the generator. During normal operation, current from the generator is rectified and supplied to the generator field winding as will be described below. During a starting period, however, the generator field winding is excited by current from a 27.5-volt battery 14. A starting circuit comprising a push-button switch 15, relays 16 and 17, a bridge type rectifier 18 and a transformer 19 is provided. When the switch 15 is closed, a circuit is completed which may be traced from the positive terminal of battery 14, through the armature and contact of relay 17, through switch 15, through the upper winding of relay 16 to one terminal of field winding 13 and from the other terminal of the field winding to the negative terminal of battery 14. Relay 16 is locked up through a circuit completed through the upper armature and contact of relay 16. The operation of relay 16 causes a circuit to be completed from the positive terminal of battery 14 through the armature and contact of relay 17, through the lower winding of relay 16 and through a contact and lower armature of relay 16 to the negative battery terminal. The resulting energization of the lower winding of relay 16 sets up in the relay core a magnetomotive force which opposes the magnetomotive force due to current supplied to its upper winding, thereby causing the armatures of relay 16 to be released. At this time current is supplied from generator 10 through transformer 19 to the bridge rectifier 18 which supplies rectified current to a circuit comprising the winding of relay 17, thereby causing the relay to operate to open the current path from the positive battery terminal to the generator field winding. Therefore, while the generator is running, battery 14 cannot be reconnected to the generator field by accidentally closing the starting switch 15.

After the starting period, exciting current is supplied to the generator field 13 by a rectifier comprising a rectifier tube 20 (type 6CF) to which alternating current is supplied from generator 10 through windings of a transformer having four windings 21, 22, 23 and 24. In operation, the field excitation varies from about 3.0 to 4.2 amperes for minimum and maximum load, respectively, when the frequency of the generated current is about 400 cycles and from about 1.5 and 2.2 amperes for minimum and maximum load, respectively, when the frequency of the generated current is about 800 cycles. The field excitation is automatically controlled to maintain the load voltage at 115 volts plus or minus 2 per cent under all operating conditions of load and frequency. The end terminals of winding 21 are connected to the anodes, respectively, of rectifier tube 20, a mid tap of winding 21 is connected to one terminal of the field winding 13 and the cathode of tube 20 is connected to the other terminal of the field winding. Transformer winding 23 and a load compounding resistor 25 are connected in series in one side of the line going from the generator to the load. The transformer winding 22 is connected in series with the alternating current winding 26 of a saturable reactor 27 across the output of generator 10, the reactor also having a saturating winding 28 to which variable direct current is supplied for controlling the reactance of the winding 26. When the frequency of the generator output current is 800 cycles, if no current were supplied to the reactor winding 28 so that the reactance of winding 26 would be at a maximum, and when the load is light the winding 23 has sufficient turns to bring the field excitation to a value such that the load voltage is somewhat below the normal load voltage of 115 volts, say 105 volts. Sufficient current is supplied to the saturating winding 28 to reduce the reactance of winding 26 and thereby to increase the excitation of field winding 13 of the generator to a value such that the load voltage is increased to 115 volts.

Direct current is supplied to the saturating winding 28 of reactor 27 from a full wave rectifier comprising rectifier tubes 31 and 32 (type 6V6GT/G), the amplitude of the direct current being controlled by a control voltage impressed upon a circuit connecting the control grid and cathode of each of tubes 31 and 32. Alternating current is supplied to the rectifier through a transformer having a primary winding 33 connected across the load circuit and secondary windings 34 and 35. The end terminals of transformer winding 34 are connected to the anodes, respectively, of tubes 31 and 32, one terminal of reactor winding 28 is connected to a mid terminal of transformer winding 34 and the other terminal of reactor winding 28 is connected to the cathodes of tubes 31 and 32. The end terminals, respectively, of transformer winding 34 are connected through 400 ohm resistors 36 and 37 to the screen grids of tubes 31 and 32, respectively. The terminals of transformer winding 35 are connected across a circuit comprising 0.25 microfarad condenser 38, shunted by 100,000 ohm resistor 39, and in series therewith a rectifying element 40. A biasing voltage of 35 volts is thus set up across the terminals of condenser 38 and of resistor 39. The control circuit for the rectifier tubes 31 and 32 may be traced from the cathodes, through condenser 38 through a one microfarad condenser 41, through 500,000 ohm resistor 42 and through 500,000 ohm resistor 43 to the control grid of tube 31 and from a terminal of resistor 42 through 500,000 ohm resistor 44 to the control grid of tube 32. It is thus apparent that the resultant control voltage for tubes 31 and 32 comprises as components the voltages across condenser 41 and resistor 42, respectively, and the biasing voltage across condenser 38.

The control voltage component across condenser 41 is derived by means of a circuit of the type disclosed in a copending application of W. H. Bixby, Serial No. 575,464, filed January 31, 1945, now Patent No. 2,435,573, granted February 10, 1948. There is provided a transformer having a primary winding 51 connected across the line which supplies current to load 11 and secondary windings 52 and 53, a 10,000 ohm potentiometer 54 being connected across a portion of winding 53. Across the secondary winding 52 are connected in series 18,000 ohm resistor 55, 6,000 ohm rheostat 56, a thermistor 58 and an ambient temperature compensating resistor 57. Thermistors are described, for example, in an article by G. L. Pearson in "Bell Laboratories Record" for December, 1940, page 106, et seq. They are made from a class of materials known as semi-conductors which have a relatively large negative temperature coefficient of resistance. As the thermistor temperature is raised due to increased current flowing through it, for example, its resistance decreases at such a rate that the voltage drop across the thermistor element decreases. The resistance of resistor 57 is not affected by current changes therethrough, but its resistance changes due to ambient temperature changes in such a way as to compensate for resistance changes of the thermistor due to changes of ambient temperature. There is provided a space current tube 60 (type 6AC7) having its cathode connected to a common terminal of transformer winding 52 and thermistor element 58 and having its anode connected through 200,000 ohm resistor 61 to a tap of transformer winding 52. Another tap of transformer winding 52 is connected to the screen grid of the tube 60. Condenser 41 and 100,000 ohm resistors 62 are connected in series across resistor 61. The voltage across the load compensating resistor 25 is stepped up by a transformer 63 and impressed upon a 10,000 ohm potentiometer 64. A circuit may be traced from the grounded cathode of tube 60, through thermistor element 58 and its compensating resistor 57, through transformer winding 53 and potentiometer 54, through secondary winding of transformer 63 and its potentiometer 64 and through 100,000 ohm resistor 65 to the control grid of tube 60.

Considering the operation of the voltage regulating circuit as thus far described, if a small increase in load voltage occurs, for example, the voltage component set up by transformer winding 53 in the control grid-cathode circuit of tube 60 will increase and that across the thermistor 58 and resistor 57 in series will decrease to cause an increase of the control grid-cathode voltage of tube 60. The control grid-cathode voltage is 180 degrees out of phase with respect to the anode-cathode voltage so that the space current of the tube flowing through resistor 61 will decrease due to the increase of load voltage. The voltage across condenser 41 therefore decreases to make the control grids of rectifier tubes 31 and 32 relatively less positive or more negative with respect to the cathodes, thereby causing the current supplied to the reactor saturating winding 28 to decrease. Because of the resulting increase of the reactance of reactor winding 26, the exciting current supplied to generator field winding 13 is reduced, thereby limiting the initially assumed rise of load voltage to a relatively small amount.

When the load is increased, for example, the voltage drop in the line through which current is supplied to the load increases. The voltage at the generator terminals in increased to compensate for the increased drop in the line due to the increased voltage across the load compensating resistor 25. The voltage across the adjustable portion of potentiometer 64 which is in the grid-cathode circuit of tube 60 is in phase opposition to the voltage supplied from transformer winding 53. Therefore, the grid-cathode voltage of tube 60 is reduced in response to the increased load, thereby causing condenser 41 to be charged to a relatively higher voltage. As a result, increased current is supplied to winding 28 of reactor 27 and to the field winding 13, thus causing the terminal voltage of generator 10 to be increased to compensate for the increased drop in the leads connecting the generator to the load.

The regulator circuit as thus far described will operate to maintain the load voltage substantially constant except for voltage transients produced as a result of sudden large changes of load, for example. The regulator as thus far described will not prevent the occurrence of such transient load voltage changes because the thermistor is somewhat sluggish in changing its resistance when the current through it changes because of the time required for the temperature of the thermistor to increase or decrease. If the thermistor circuit alone were relied upon the load voltage would rise by a relatively large amount, if the load were decreased suddenly, before the thermistor circuit would become effective to reduce the load voltage substantially to its normal operating value. Additional means are therefore provided for reducing or substantially preventing transient voltage changes across the load, said means comprising a bridge rectifier 66 supplied with current from transformer winding 24, one microfarad condenser 67 and 100,000 resistor 68 connected in parallel across the output terminals of rectifier 66, and two microfarad condensers 69 and resistor 42 in series connected across the output of rectifier 66 in parallel with condenser 67 and resistor 68.

When the load is suddenly increased by a large amount, for example, increased current must be supplied to the field winding 13 in order to prevent a reduction of load voltage. Increased current is supplied to the field winding due to the increased load current flowing through transformer winding 23 and the resulting increased voltage induced in the transformer winding 21. In fact, if the circuit comprising rectifier 66 and its associated circuit elements were not employed, the increased current supplied to the generator field winding would be too large and the load voltage would be increased above its normal value. However, the increased load current flowing through transformer winding 23 also results in an increased voltage across rectifier 66 and the charge on condenser 69 is therefore increased to produce a transient voltage drop across resistor 42. This voltage drop is in a direction to make the grids of tubes 31 and 32 relatively more negative with respect to their cathodes, thereby reducing the current through the reactor winding 28 and causing a reduction of the current supplied to the field winding 13.

This action results in preventing overshooting of the load voltage when the load is suddenly increased. The circuit is so designed that the load voltage is reduced slightly below the normal voltage when the load is suddenly increased. As the voltage across condenser 69 increases, with the result that the voltage drop across resistor 42 decreases and the load voltage rises slightly to its normal value, the temperature of thermistor element 58 increases to cause the charge on condenser 41 to be decreased. Therefore, as the voltage across resistor 42 further decreases, the voltage across condenser 41 will further decrease and, since these two voltages in the grid-cathode circuit of tubes 31 and 32 are opposed with respect to each other, the resulting grid-cathode voltage and the current through saturating winding 28 of the reactor will remain substantially constant, thereby maintaining the load voltage at substantially its normal operating voltage. If the load should suddenly decrease, condenser 69 would discharge through resistor 42 due to the decreased voltage across the output of rectifier 66, thereby setting up a voltage across resistor 42 which tends to cause the field current of the generator and, therefore, the load voltage to increase, the load voltage being brought substantially to its correct operating value. In this case, the voltages across resistor 42 and across condenser 41, respectively, are in aiding relationship and, as the voltage across resistor 42 decreases, that across condenser 41 will increase to maintain the grid-cathode voltage of tubes 31 and 32 substantially constant and thereby to maintain the load voltage substantially constant.

What is claimed is:

1. The combination with a current path to which current is supplied from an alternating current source, of a reactor having a first winding in said current path and a second winding for controlling the impedance of said first winding in accordance with direct current supplied to said second winding, a rectifier for supplying direct current to said second winding comprising a space discharge device having an anode, a cathode and a control electrode, a circuit connecting said control electrode and said cathode, a first means to which current is supplied from said source for impressing upon said control electrode-cathode circuit a transient voltage component only when a change of amplitude of the current supplied to said first means occurs to cause the impedance of said first reactor winding to transiently change in a direction to oppose the change of current supplied to said first means, and a second means to which current is supplied from said source for impressing upon said control electrode-cathode circuit a undirectional voltage component which varies in response to amplitude change of the current supplied to said second means to cause the impedance of said first reactor winding to change in a direction to oppose the change of current supplied to said second means, the response of said second means to changes of current supplied thereto being slow relative to the response of said first means.

2. In combination with an alternating current generator for supplying current to a load, said generator having a field winding, of means comprising a rectifier for rectifying current supplied thereto and for supplying the rectified current to said field winding, a first means excluding said load for supplying alternating current from said generator to said rectifier, a second means energized by said load current for supplying alternating current to said rectifier, and means responsive to an increase of current supplied by said second means to said rectifier for controlling said first means to cause a reduction of the current supplied by said first means to said rectifier, and vice versa, thereby minimizing voltage transients across said load.

3. In combination, a generator for supplying alternating current to a load, a field winding for said generator, means for supplying exciting current to said field winding under control of current supplied to said means, means comprising two current paths for supplying current from said generator to said exciting current supplying means, a first of said current paths comprising said load, the second of said current paths excluding said load, and means responsive to an increase of load current for increasing the impedance of the second of said current paths, and vice versa, whereby transient load voltage changes are minimized.

4. The combination with a source of alternating current and a saturable reactor, of a circuit to which current from said source is supplied, said circuit comprising a first winding of said saturable reactor, said reactor having a second winding, means comprising a first rectifier for rectifying current from said source and for supplying rectified current to said second winding, a second rectifier for rectifying current supplied thereto from said source, the output voltage of said second rectifier varying in response to amplitude changes of current supplied thereto from said source, and means responsive to changes of output voltage of said second rectifier for setting up a transient voltage proportional to the rate of change of said output voltage for controlling said first rectifier to thereby control the reactance of said first reactor winding and the current supplied from said source to said circuit.

5. The combination with a source of alternating current and a circuit for supplying current from said source to a load, of means for controlling the current supplied from said source to said load, said means comprising a reactor having a first winding and a second winding to which variable direct current may be supplied for controlling the reactance of said first winding, means comprising a rectifier for rectifying current from said source and for supplying the rectified current to said second reactor winding, said rectifier having a control means, and means for controlling said rectifier to control the amplitude of the rectified current supplied to said second reactor winding, said means comprising means for setting up and impressing upon said control means a voltage comprising two components, one of said voltage components being a relatively steady unidirectional voltage which varies in response to load voltage changes for causing the average load voltage to be maintained substantially constant and the other component being a transient voltage derived from said load circuit which is substantially proportional to the rate of change of load current.

6. In combination, a generator for supplying current to a load, a field winding for said generator, a transformer having four windings, rectifying means connected to a first of said transformer windings for supplying rectified current to said generator field winding, a reactor having a first and a second winding, means for supplying current from said generator through said first reactor winding to a second winding of said transformer, means for connecting a third winding of said transformer in series with said load with respect to said generator output, a second rectifying means connected to said fourth transformer winding, means for supplying current derived from said generator to said second reactor winding to control the impedance of said first reactor winding, and means responsive to change of current supplied to said second rectifying means for controlling said means for supplying current to said second reactor winding, thereby minimizing transient changes of voltage across said load.

7. In combination with an alternating current generator for supplying current to a load, said generator having a field winding, of means comprising a rectifier for rectifying current supplied thereto and for supplying the rectified current to said field winding, a first means for supplying alternating current from said generator to said rectifier, a second means for supplying alternating current from said generator to said rectifier, and means responsive to an increasing current supplied by said first means for controlling said second means to cause a decreasing current to be supplied by said second means, and vice versa, thereby minimizing voltage transients across said load.

8. In combination, with a source of alternating current and a circuit for supplying current from said source to a load, of control means under control of current supplied thereto for controlling the supply of current from said source to said load and to thereby control the load voltage, a first means for supplying current from said source to said control means, a second means for supplying current from said source to said control means, and means responsive to an increasing current supplied by said first means to said control means for controlling said second means to cause a decreasing current to be supplied by said second means to said control means, and vice versa, thereby minimizing voltage transients across said load.

9. In combination, means for supplying current from an alternating current source to a load, a saturable reactor having a first winding and a second winding to which current may be supplied for controlling the impedance of said first winding, means comprising said first reactor winding for controlling the supply of current from said source to said load, means for setting up a first voltage which varies in accordance with load voltage changes, said means responding relatively slowly to load voltage changes, a circuit comprising a condenser and a resistor in series, means for changing the charge on said condenser in response to a change of current supplied from said source to said load to thereby set up a transient voltage across said resistor, and means for utilizing said first voltage and said transient voltage for controlling the supply of current from said source to said second reactor winding, thereby minimizing load voltage variations.

10. Means for minimizing voltage changes across a load to which current is supplied by an alternator by controlling the energization of a field winding of the alternator, comprising a first rectifier for supplying unidirectional current to said field winding under control of alternating current supplied to said rectifier, a reactor having a first winding and a second winding, means comprising said first winding for supplying current from said alternator output to said first rectifier, means comprising a second rectifier for rectifying current supplied thereto from said alternator output and for supplying said rectified current to said second reactor winding for controlling the impedance of said first reactor winding, said second rectifier having a control means responsive to a control voltage for controlling the rectified current supplied to said second reactor winding, means for setting up and impressing upon said control means a voltage which varies with load voltage variations, said means including resistance means the resistance of which changes due to temperature changes thereof caused by changes of current supplied thereto from said load circuit, a third rectifier, means for supplying to said third rectifier from said alternator output a current which varies in response to changes of current supplied to said load, a current path comprising a condenser and a resistor in series connected across the output of said third rectifier, and means for impressing upon said control means the transient voltage produced across said resistor in response to load changes for minimizing transient changes of load voltage.

11. In combination, a generator having a field winding, a circuit for supplying current from said generator to a load, means for supplying to said field winding a current which increases in response to an increase of load current and vice versa, and means for limiting the rate of change of said field current comprising means for setting up a direct voltage which varies in accordance with changes of said load current, means for setting up a second voltage proportional to the derivative of said direct voltage, and means responsive to said second voltage for controlling said means for supplying current to said field winding.

DAVID E. TRUCKSESS.

REFERENCES CITED

The following references are of record in the file of this patent:

UNITED STATES PATENTS

| Number | Name | Date |
|---|---|---|
| 1,948,372 | Fitzgerald | Feb. 20, 1934 |
| 1,985,004 | West | Dec. 18, 1934 |